Nov. 27, 1951   J. O. KRAUSE   2,576,090
SAWING ATTACHMENT FOR PORTABLE ELECTRIC DRILLS
Filed Feb. 16, 1950
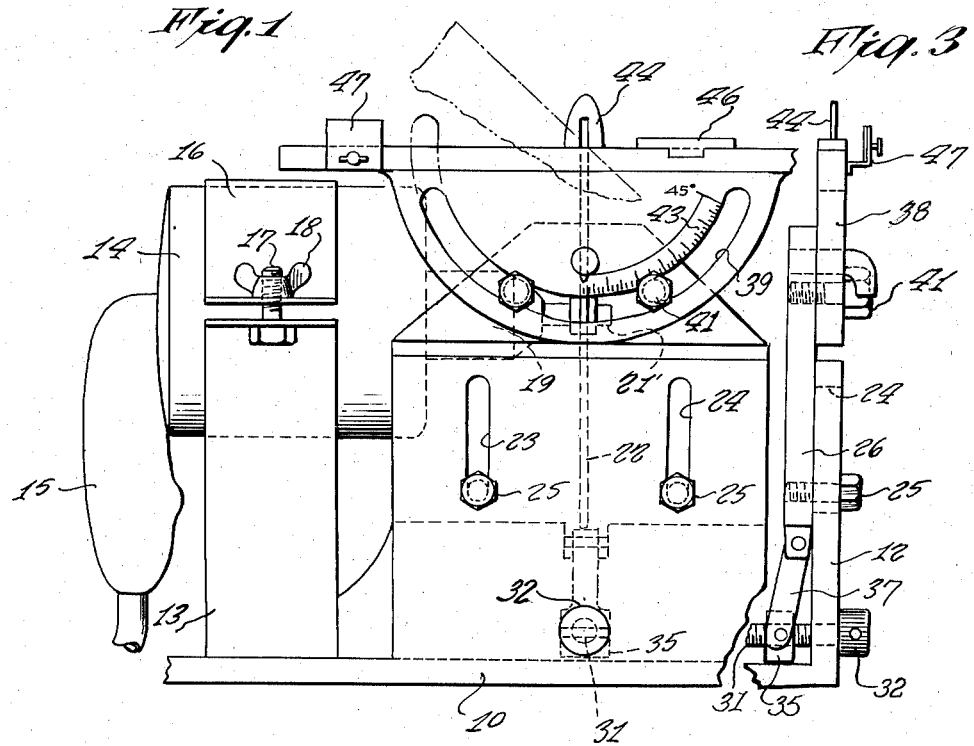
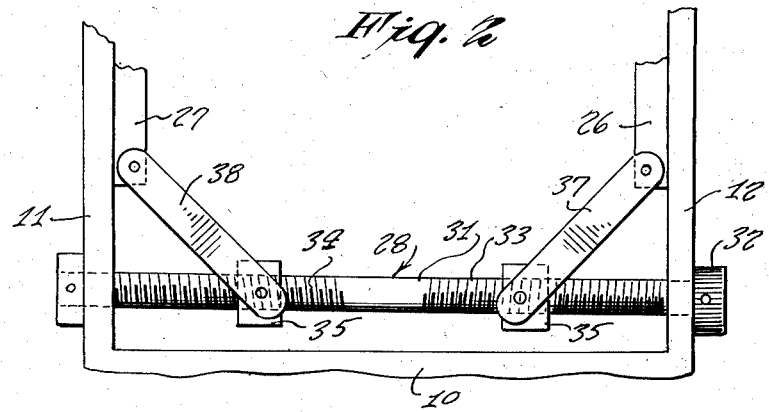
INVENTOR.
JULIUS OTTO KRAUSE
BY
Carl Miller
ATTORNEY Patented Nov. 27, 1951

2,576,090

UNITED STATES PATENT OFFICE 2,576,090

SAWING ATTACHMENT FOR PORTABLE ELECTRIC DRILLS

Julius Otto Krause, West Hempstead, N. Y.

Application February 16, 1950, Serial No. 144,423

1 Claim. (Cl. 143—132)

This invention relates to a hobby craft device.

It is an object of the present invention to provide a device which is adapted for use with regular motor power drills which serves as a mounting means for the drill and wherein the drill can have a saw blade placed on the same and wherein the device will have suitable adjustments so as to elevate the support for the material being sawed and also to permit the angular adjustment of the top so that cuts can be made on a bias or angle and on a mitre.

Other objects of the present invention are to provide a support for an ordinary electric power drill so that the drill can be used for sawing wherein the device is adjustable, which is of simple construction, inexpensive to manufacture, easy to adjust, adapted to detachably receive the motor power drill, has a minimum number of parts, convenient to use, and efficient in operation.

For other objects and for a better understanding of the invention, reference may be had to the following detailed description taken in connection with the accompanying drawing, in which Fig. 1 is a side elevational view of the arrangement with the motor drill attached to it.

Fig. 2 is an enlarged fragmentary end elevational view of the arrangement.

Fig. 3 is a fragmentary end elevational view showing the upper parts of the arrangement.

Referring now to the figures, 10 represents a base having upright side portions 11 and 12 and an upright portion 13 by which an electric power drill 14 with its handle 15 can be supported upon the arrangement. The drill 14 is held in place by a curved clamping plate 16 and clamping bolts 17 made secure by wing nuts 18. The electric motor has the usual chuck 19 to which may be attached a shaft 21 for the securement to the shaft of a saw blade 22.

In the respective upright portions 11 and 12 are vertically extending elongated slots 23 and 24 into which extend securing bolts 25 that fix an adjustable plate 26 to the upright portions after a vertical adjustment of the plate 26 has been made by adjusting mechanism indicated generally at 28. This adjusting mechanism 28 includes a long screw 31 with a knob 32 thereon and having right and left thread portions 33 and 34. Connected respectively to the thread portions are block nuts 35 and 36. Links 37 and 38 respectively connect the block nuts 35 and 36 with the vertically extending slide plates 26 and 27 respectively. As the screw 31 is turned, the plates 26 and 27 will be adjusted vertically providing the bolts 25 are loose at the time. Thereafter, the bolts 25 will be tightened to make the slide plates secure upon the upright portions 11 and 12. By means of this adjustable mechanism 28, the depth of cut of the saw can be regulated.

Upon each of the slide plate 26 and 27 is an angle plate 38. This angle plate has an arcuate slot 39 to permit the adjustment of the plate relative to the slide plates. Bolts 41, when tightened, will secure the plate 38 in its adjusted position. By adjusting the vertical plate 38, an angle or mitre cut can be effected upon the work piece. Angle indications 43 are provided on the inner side of the arcuate slot 39. Since there are two of these vertical plates on the opposite sides, a rest is afforded the work piece and plates 38 are angled, as indicated by the dot and dash lines at the top of Fig. 1, so as to make a cut on the work piece at a mitre or angle.

A guard 44 may be provided over the saw blade. A support piece 46 may extend between the vertical plates 38. A gauge 47 can also be provided upon the plate 38.

It should be apparent that there has been provided an adjustable arrangement for electric power drills which are to be used for the sawing of work pieces wherein vertical adjustment can be made of the work piece to alter the depth of cut and wherein an angular adjustment can be made to permit the cutting of the work piece at an angle or otherwise.

While various changes may be made in the detail construction, it shall be understood that such changes shall be within the spirit and scope of the present invention as defined by the appended claim.

Having thus set forth and disclosed the nature of my invention, what is claimed is:

A sawing attachment for a portable electric drill, including a base, substantially parallel upright portions extending rigidly upward from the opposite ends of the base, slide members adjustably connected to the upright portions respectively, an adjusting screw journalled in the upright portions and extending therebetween, said adjusting screw having reverse threaded portions thereon, block nuts mounted upon and respectively co-operating with the reverse threaded portions, links connecting the respective block nuts with the respective separate adjustable slide members, a power drill supporting member extending upwardly from the base, a power drill mounted on the supporting member and secured thereto and having a saw blade adapted to be driven thereby, said saw blade extending between the upright portions upon the base, said adjustable slide members having support means for a work piece along which the work piece can be moved while being cut by the saw, said supporting means comprising vertically extending support plates respectively connected to the slide members, each of said support plates having an arcuate slot, bolt means extending through each slot for securing each respective support plate to its respectively co-operating slide member, whereby the support plates can be disposed at various angles in order to allow a mitre cut to be made in the work piece.

JULIUS OTTO KRAUSE.

REFERENCES CITED

The following references are of record in the file of this patent:

UNITED STATES PATENTS

| Number | Name | Date |
| --- | --- | --- |
| 1,697,669 | Tautz | Jan. 1, 1929 |
| 1,756,527 | Thompson | Apr. 29, 1930 |
| 1,922,151 | Boice et al. | Aug. 15, 1933 |
| 2,062,969 | Dutcher | Dec. 1, 1936 |
| 2,200,799 | Miller | May 14, 1940 |
| 2,512,419 | Dergance | June 30, 1950 |
| 2,523,680 | Christie | Sept. 26, 1950 |

FOREIGN PATENTS

| Number | Country | Date |
| --- | --- | --- |
| 612,779 | France | Aug. 7, 1926 |